Jan. 31, 1961  J. F. JACOBS ET AL  2,969,994

LOCK SPRING JOINT

Filed Aug. 8, 1958

INVENTORS.
JOHN F. JACOBS
JOHN M. HOLDEN
ARTHUR C. ELLINGS
BY

J. M. St. Amand

ATTORNEYS.

United States Patent Office 2,969,994
Patented Jan. 31, 1961

2,969,994

LOCK SPRING JOINT

John F. Jacobs, Fontana, John M. Holden, China Lake, and Arthur C. Ellings, Palos Verdes Estates, Calif., assignors to the United States of America as represented by the Secretary of the Navy Filed Aug. 8, 1958, Ser. No. 754,118

7 Claims. (Cl. 285—34)

(Granted under Title 35, U.S. Code (1952), sec. 266)

The invention described herein may be manufactured and used by or for the Government of the United States of America for governmental purposes without the payment of any royalties thereon or therefor.

This invention relates to the mechanical coupling of tube joints and particularly to a screw-type, self-locking, lock spring joint for connecting two tubes together, one within the other.

Former methods of joining tubular parts had various disadvantages. Crimping of the metal tubes together depended upon the crimping machine for alignment and the joint could not be disassembled. Rolling a portion of an outer tube into a groove cut around an inner tube resulted in a joint that could not be disassembled. Fastening an inner tube and an outer tube with pins would not result in satisfactory alignment. The present invention overcomes the disadvantages of prior methods for coupling two tubes together.

In the present invention threads are cut on the inner tube and a spring is compressed into the threads so that its diameter is less than the diameter of the inner tube. The inner tube is then inserted into the outer tube and is rotated until tabs on the outside periphery of the compressed spring protrude into matching slots which have been punched in the outer tube preventing the inner tube from sliding out of the outer tube. The inner tube is then rotated with relation to the outer tube until it fits tightly therein.

An object of the invention therefore is to provide a new and improved coupling joint for tubing.

Another object is to provide a high strength joint, for thin-walled tubing, that may be disassembled.

A further object of the present invention is to provide a method of forming a high strength joint for coupling two tubular members in accurate axial alignment.

Further objects and many of the attendant advantages of the invention will become apparent as the same becomes better understood from the following detailed description had in conjunction with the annexed drawings wherein.

Figure 1:
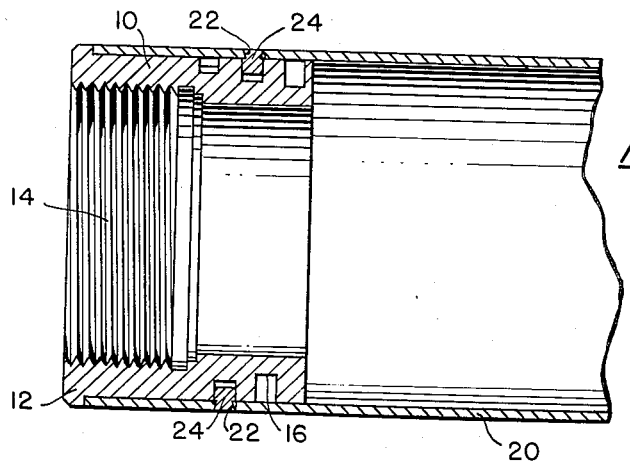
Fig. 1 is a cross-sectional view taken along line 1—1 of Fig. 2 and showing two tubular members coupled together by means of the lock spring joint of the present invention.
Figure 2:
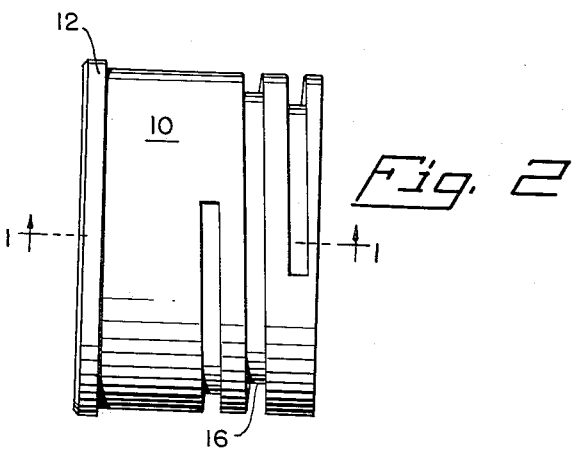
Fig. 2 is a side view of the inner tubular member of Fig. 1 showing the grooves formed therein.

Referring now to the drawings like numerals refer to like parts in all of the figures. In Figs. 1 and 2 an inner tubular member 10 is shown having a flange 12 and internal threads 14 which are optional and are only shown as an example. Inner tubular member 10 is provided with a screw type groove 16 about the outside thereof. Groove 16 has two distinct diameters with a step down from a large to a smaller diameter. Due to the machining of groove 16, the initial portions of the larger and smaller diameters thereof are tapered. This taper is illustrated in Fig. 1 wherein the upper left portion of groove 16 is shown of lesser depth than the larger diameter section of groove 16. It is to be understood that groove 16 could be machined so as to omit the taper thereby providing a groove of uniform depth.

Figure 3:
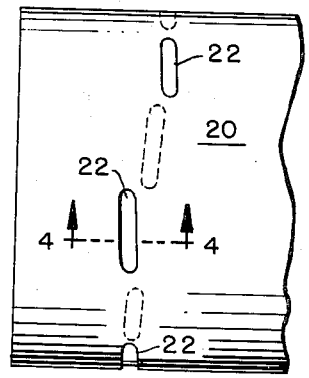
Fig. 3 is a side view of the outer tubular member showing slots punched therein.
Figure 4:
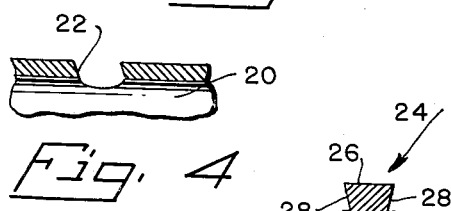
Fig. 4 is a cross-sectional view of a slot, taken along the line 4—4 of Fig. 3.

An outer tubular member 20, as illustrated in Figs. 1 and 3, has an internal diameter such as will fit closely over the extrenal diameter of tubular member 10. Outer tubular mmeber 20 has six elongated slots 22 spaced equidistant around the diameter thereof; the slots may be punched or machined, for example, and are cut with a lead to coincide with groove 16 in the inner tubular member 10. In Fig. 4 is illustrated a cross-section of slots 22 showing the sides of the slots as being at a slight angle from the perpendicular to the outer surface of tubular member 20.

Figure 5:
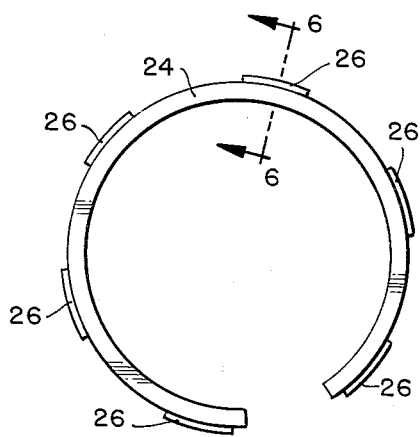
Fig. 5 is a view of the lock spring which is used to hold the two tubular members together.
Figure 6:
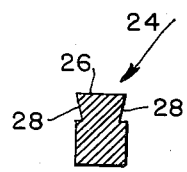
Fig. 6 is a cross-sectional view of the lock spring taken along the line 6—6 of Fig. 5.

A lock spring 24, as illustrated in Figs. 5 and 6, is used for coupling tubular members 10 and 20 together. Lock spring 24, for example, may be made from any steel that can be heat treated to Rockwell hardness of 44C to 50C, and may be machined from tubing with standard equipment. The lock spring has six elongated tabs 26 of substantially the same length as slots 22 and spaced equidistant around the diameter of the lock spring. A taper 28 of 15 degrees, for example, is cut into each face of the tabs so the spring is perfectly symmetrical for ease of assembly. Lock spring 24 fits into groove 16, as shown in Fig. 1. A cone shaped sleeve may be used to slip the lock spring into groove 16 on tubular member 10 without damaging the ring groove.

In coupling the tubular members 10 and 20 together lock spring 24 is slipped into groove 16 in tubular member 10 and is rotated back from the largest diameter portion of the groove toward the opposite end of the groove which has the smallest diameter. The end of inner tubular member 10 is then slipped into the end of outer tubular member 20. The first tab 26 on the lock spring is lined up with its appropriate slot 22 in tube 20 and the lock spring is depressed with a strap wrench, for example. Inner tubular member 10 is then moved into outer tubular member 20 allowing tabs 26 of the lock spring to protrude into the slots 22 in the outer tubular member. Slots 22 are made to provide clearance for tabs 26 to enter the slots freely. The outer tubular member is then rotated relative to the inner tubular member until the end of outer tubular member 20 is in facial abutment with flange 12. Upon a slight degree of further relative rotation, the lock spring is forced tightly against the side of the larger diameter section of groove 16 and the end of the outer tubular member is forced tightly in facial abutment with the flange, thereby forming a firm, accurately aligned coupling between the two tubular members. The relative dimensions are selected so that, upon forced facial abutment, lock spring 24 is entirely within the larger diameter section of groove 16. This novel joint can be disassembled without destroying either of the tubular members or the lock spring.

Obviously, many modifications and variations of the present invention are possible in the light of the above teachings. It is therefore to be understood that within the scope of the appended claims the invention may be practiced otherwise than as specifically described.

What is claimed is:

1. A lock spring joint for effecting connection between a tubular body member and a tubular sleeve member, one end of said body member being such as to closely fit within one end of said sleeve member, said end of the body member having a spiral groove cut therein, said end of the sleeve member having a series of elongated slots therethrough, said slots being spaced from one another and arranged in a spiral path coinciding in lead with that of the spiral groove in said body member, a lock spring member having a series of integral raised tabs of a disposition and size to fit said elongated slots, said lock spring being of cross-sectional dimensions such that it and its tabs may be compressed to fit entirely in said groove to allow assembly of said body and sleeve members and disassembly thereof, said spring in its expanded position with the tabs projecting into said slots forms a screw threaded connection between said body and sleeve members.

2. A lock spring joint for effecting connection between a first tubular member and a second tubular member, the outer diameter of one end of said first tubular member being of substantially the same dimension as the inner diameter of one end of said second tubular member such as to provide a close fit when slipped together, said one end of said first tubular member having a spiral groove cut therein, the end of said second tubular member having a series of elongated slots therethrough, said slots being spaced from one another and arranged in a spiral path coinciding in lead with that of the spiral groove in said first tubular member, a lock spring member having a series of integral raised tabs of a disposition and size to fit said slots, said lock spring being of cross-sectional dimensions such that it and its tabs may be compressed to fit entirely in said groove to allow assembly of said first and said second tubular members and disassembly thereof, said spring in its expanded position with the tabs projecting through said slots forms a screw threaded connection between said first and second tubular members.

3. A lock spring joint as in claim 2 wherein said slots and said tabs are spaced equidistant about said second tubular member and said lock spring.

4. A lock spring joint as in claim 2 wherein the depth of said groove in the first tubular member varies having two portions of distinct diameters with a step down from the larger to the smaller diameter, said first portion being of such a depth to allow the lock spring and its tabs to be compressed entirely in said first portion and said second portion being positioned axially toward the other end of said body member and of such depth as to allow only the lock spring and not the tabs to be compressed entirely in said second portion, whereby when the first tubular member is rotated relative to said second tubular member the lock spring will be displaced from said first portion and into said second portion.

5. A lock spring joint as in claim 2 wherein a flange means is provided on said first tubular member for bearing against the end edge of said second tubular member when the two members are connected together providing accurate axial alignment of the assembled members.

6. A lock spring joint as in claim 2 wherein the longitudinal sides of said elongated slot are substantially parallel and at a slight angle to the perpendicular to the sides of said second tubular member.

7. A lock spring joint as in claim 2 wherein the sides of the tabs on said lock spring are slightly tapered inwardly from the outer edge thereof toward the center.

References Cited in the file of this patent

UNITED STATES PATENTS 2,461,863   Zeeb _____ Feb. 15, 1949